Jan. 11, 1966 D. C. ENGELBART ETAL 3,229,267
MAGNETIC CORE DEVICE
Filed Nov. 23, 1962
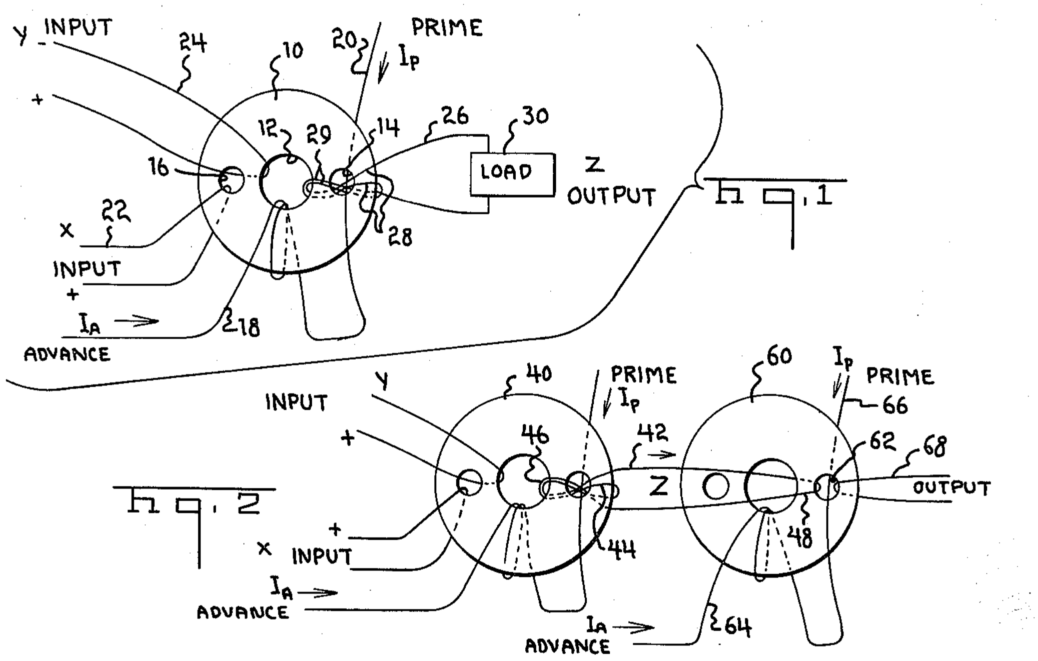
FIG. 1, FIG. 2
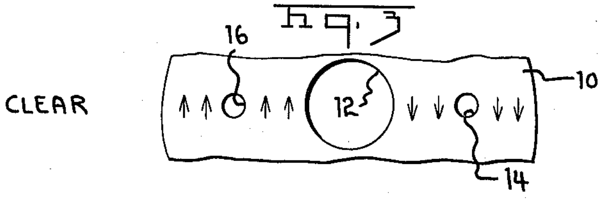
FIG. 3
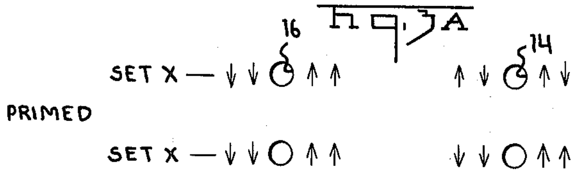
FIG. 3A
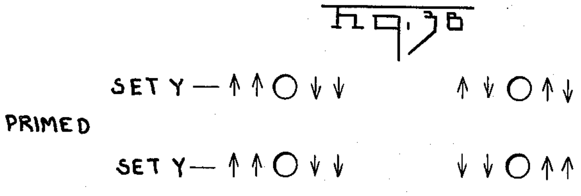
FIG. 3B
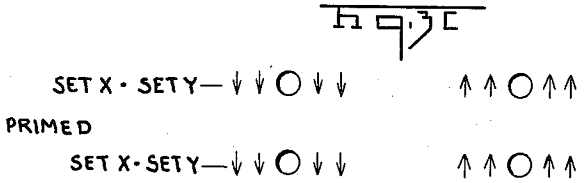
FIG. 3C
FIG. 4
| INPUTS | | OUTPUT |
|---|---|---|
| X | Y | Z |
| 1 | 0 | 1 |
| 0 | 1 | 1 |
| 1 | 1 | 0 |
| 0 | 0 | 0 |
*INVENTORS*
DOUGLAS C. ENGELBART
*BY* LAWRENCE G. WILEY
Curtis, Morris + Safford 3,229,267

MAGNETIC CORE DEVICE

Douglas C. Engelbart, Palo Alto, Calif., and Lawrence G. Wiley, Camp Hill, Pa., assignors to AMP Incorporated, Harrisburg, Pa.

Filed Nov. 23, 1962, Ser. No. 239,633
7 Claims. (Cl. 340—174)

This invention relates to a multi-aperture magnetic core device for manipulating intelligence.

In the article "Analysis of MAD–R Shift Registers and Devices," 1960 Proceedings—Special Technical Conference on Nonlinear Magnetic and Magnetic Amplifiers, Philadelphia, Oct. 26–28, 1960, published by the A.I.E.E. by Dr. D. R. Nitzan—there is described a multi-aperture magnetic core and circuit technique which has proven highly satisfactory in building commerially feasible magnetic core devices. A multi-aperture core shift register employing this technique is shown and described in U.S. Patent 2,995,731 to Joseph P. Sweeney. The present invention constitutes an adaptation of this technique to a basic logic circuit. The publication by Dr. Nitzan may be referred to for background as to general material and energy requirements of the invention. The patent to Joseph P. Sweeney may be referred to for a helpful and convenient physical arrangement of cores and windings used in practicing the invention.

In building magnetic core devices utilizing the MAD–R technique described in the above publication and patent there are two general approaches which may be followed to provide a given circuit function. The first of these may be considered as a core material geometry approach wherein a desired circuit function is accomplished primarily by controlled flux exchanges between paths of magnetic material within a given core. The second approach utilizes a relatively simple core geometry and accomplishes the principal circuit function through relatively complicated transfer windings, often in conjunction with auxiliary cores. The first approach has a practical shortcoming dictated by the state of the art in manufacturing magnetic cores. As yet, complicated core geometries cannot be carried on a production basis with any consistency in core threshold characteristics. The use of relatively complicated windings and auxiliary cores has the shortcoming of requiring high labor cost as well as increasing the likelihood of assembly error and circuit failure incident to the use of additional assembly steps and a greater number of components. While numerous magnetic core devices exist for performing various logic functions, all such devices have one or the other of the above shortcomings.

Accordingly, it is one object of the present invention to provide a multi-aperture magnetic core intelligence transfer circuit employing a standard core of simple geometry.

It is a further object of the invention to provide an intelligence logic circuit employing a single core having relatively few circuit windings.

It is another object of the invention to provide an improved multi-aperture magnetic core circuit capable of performing logic functions at higher frequencies than heretofore possible.

It is still another object of the invention to provide an inexpensive magnetic core circuit capable of reliable operation over a range compatible with standard electronic equipment.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing objects are obtained by the present invention through the use of input and output windings linking different paths of magnetic material defined by the major and minor apertures of a single standard ferrite core. The novel configuration of the output circuit of the invention is utilized to force a splitting of flux in equal amounts in paths coupled by the output winding thereby accomplishing the generation of states of magnetization which will produce identical outputs from differently positioned input windings. Through this technique logic functions calling for the elimination of intelligence responsive to certain intelligence inputs may be accomplished without resort to complicated core geometry or complicated core winding. Since the device utilizes a single core structure, the speed of operation in performing logic functions is increased relative to prior devices employing more than a single core structure to accomplish the same circuit function.

In the drawings:

FIGURE 1 is a schematic diagram of a multi-aperture magnetic core and circuit exemplifying one embodiment of the invention;

FIGURE 2 is a schematic diagram of a multi-aperture magnetic core and circuit in accordance with a further embodiment of the invention;

FIGURES 3–3C represent conventional flux arrow diagrams utilized to explain the operation of the core and circuit of the invention; and FIGURE 4 is a truth table for a typical logic function capable of being performed by the circuit of the invention.

Referring now to the invention in more detail, FIGURES 1 and 2 each represent a core and circuit capable of performing the well known and basic logic function of Exclusive-OR. Referring to FIGURE 4 these requirements may be briefly summarized by considering possible input signals X and Y and an output signal Z formed in circuit by large or small pulses representing, respectively, intelligence in the binary form of "one" or "zero." As FIGURE 4 indicates, the Exclusive-OR function demands that for inputs of $X=1$, $Y=0$ or $X=0$, $Y=1$ there be an output of $Z=1$, whereas for inputs of $X=1$, $Y=1$ or $X=0$, $Y=0$ there be an output of $Z=0$. To accomplish this function, the circuits of FIGURES 1 and 2 include separate input windings capable of receiving X and/or Y signals from any suitable source, an output winding capable of transmitting the Z function and a transfer circuit including advance and prime windings.

As indicated in FIGURE 1, the multi-aperture magnetic core 10 is of a relatively simple geometry having a single major aperture 12 and two minor apertures 14 and 16 serving as transmitted and receiving apertures, respectively. The minor apertures 14 and 16 are centrally and symmetrically located with respect to the wall width of the core and their placement operates to define distinct paths of possible flux closure. Cores of this type are commercially available in magnetic materials having a generally rectangular hysteresis characteristic and capable of being driven by applied M.M.F. into a number of distinct stable states representative of intelligence. The aforementioned Patent No. 2,995,731 to Joseph P. Sweeney shows and describes a similar core.

The transfer circuit of FIGURE 1 is comprised of advance and prime windings 18 and 20 here shown as commonly connected. The advance winding 18 threads the major aperture 12 of core 10 by a number of turns N in a sense such that the application of a current $I_A$ of sufficient amplitude and duration will provide an M.M.F ($NI_A$) exceeding the core threshold and driving the core into a state of negative saturation. The prime winding 20 threads the transmitting aperture 14 by a number of turns N in a sense such that the application of $I_P$ will produce an M.M.F. ($NI_P$) sufficient to switch flux about aperture 14 but insufficient to switch flux about aperture 12; and this only when the core is in a state wherein substantially half the core material is in positive saturation and half in negative saturation. As with the usual MAD-R cycle, the circuit of FIGURE 1 operates in the order of input, prime, advance and output; the output occurring substantially simultaneously with advance. While the common advance-prime winding is preferred for general use, separate advance and prime circuits may be provided by including a separate return path for each winding. In either use, $I_A$ may be supplied from a suitable source capable of producing generally sinusoidal pulses generating a rapid change of flux per unit of time in the core. The priming current $I_P$ may be supplied by a pulse source generating rectangular pulses producing a relatively slow rate of switching about the core transmitting aperture.

Turning now to the function of the input and output windings of the circuit shown in FIGURE 1, reference may be had to FIGURES 3–3C wherein flux arrow diagrams are included to indicate the nature of the magnetization states achieved by the circuit of the invention. The orientation of the arrow shown in FIGURES 3–3C represent both the flux resulting from the application of input, prime or advance M.M.F. and the general orientation of core magnetic domains following the cessation of such M.M.F. The state shown in FIGURE 3 represents the Clear or "zero" magnetization state wherein substantially all of the magnetic material is in negative saturation. This state is achieved by the application of $I_A$. The states shown in FIGURES 3A and 3B represent different forms of the Set or "one" state and of the Primed Set state achieved by the application of $I_P$ wherein substantially half the magnetic material is in positive saturation. FIGURE 3C depicts yet a fourth possible state of magnetization wherein the core material is positively saturated.

In operation, intelligence utilized for input signals and required for output signals is formed of relatively large pulses representing one and relatively small pulses (zero amplitude desired) representing zero. With respect to the circuit of FIGURE 1, the one pulse must have a sufficient amplitude and duration, considering the number of turns N linking the core, to provide an M.M.F. sufficient to overcome the core threshold and drive the core into the Set or one state. Conversely, a zero input pulse must have an insufficient amplitude and duration to disturb the existing state of magnetization of the core. The number of turns N of the output winding threading the core transmitting aperture must be sufficient to produce an output pulse of substantial voltage and/or current responsive to flux changes in the magnetic material under such windings caused when the core is driven from the primed one state to the zero state by the application of advance current.

The input windings include a first winding 22 threading receiving aperture 16 about an outer leg and an input winding 24 threading aperture 16 and aperture 12 about the core inner leg. As indicated in FIGURE 1, the sense of windings 22 and 24 is such as to apply an M.M.F. tending to set the core through paths of material including the inner and outer legs, respectively. The output winding 26 includes a number of turns threading the transmitting aperture 14 to form a figure 8 configuration with oppositely oriented loops 28 and 29 encircling the outer and inner legs of magnetic material adjacent the aperture 14. Winding 26 further includes a connection to a load 30 which may be considered as a utilization circuit capable of responding to the Z output of the core device. The load 30 should be of a sufficiently high impedance such as a voltage sensitive device incapable of producing a voltage operating on windings 28 and 29 to avoid spurious setting of core 10.

Considering the operation of the circuit of FIGURE 1 it may be first assumed that core 10 is in the Clear or zero state depicted in FIGURE 3. The application of an input $X=1$, $Y=0$ will witness a relatively large pulse on winding 22 and a relatively small pulse on winding 24. As a result of this, an M.M.F. will be applied via winding 22 driving the core from the Clear state of FIGURE 3 to the Set X state shown in FIGURE 3A by driving substantially half of the core material into positive saturation. As the core is set, the output winding 26 in forming loops 28 and 29 about the inner and outer legs adjacent aperture 14 serves to force flux splitting causing an evenly divided switching of magnetic material in each leg under the output winding loops. The reason for this is that for a given M.M.F. exceeding threshold, core material switching will always occur in a manner requiring the least energy, which in the present circuit would be equal switching in both legs. If flux does not split equally, a net $dI/dt$ occurs in output winding, and the M.M.F. of the resulting output current is in a direction to steer more $\Delta\phi$ to the leg otherwise deficient. This dynamic effect cooperates with the above to assure flux splitting.

Following the above, the application of $I_P$ produces an M.M.F. driving the core into the state shown in FIGURE 3A, Primed Set X wherein the outer leg of magnetic material adjacent aperture 14 is substantially positively saturated. Thereafter, the application of $I_A$ will develop an M.M.F. driving the core to the Clear state shown in FIGURE 3. As will be apparent from FIGURE 3A, Primed Set X, the material in the outer leg adjacent aperture 14 will be switched producing a flux change inducing a voltage in the loop portion 28 of winding 26 encircling this leg; which voltage may be considered as an output of $Z=1$. In a similar manner, an input of $X=0$ and $Y=1$ will witness the core being driven to the Set Y state shown in FIGURE 3B. The application of $I_P$ will then drive the core into the Primed Set Y state shown in FIGURE 3B and the application of $I_A$ will drive the core into the clear state switching flux in one leg only under the output winding loop 28 and producing a back voltage forming an output $Z=1$.

Considering now inputs of $X=1$, $Y=1$, applied either synchronously or asynchronously to windings 22 and 24, respectively, the application of relatively large pulses on windings 22 and 24 will each serve to generate an M.M.F. setting substantially half the core material in the paths represented by the flux arrow diagrams of FIGURES 3A and 3B. As a result of this, the Set X-Set Y condition shown in FIGURE 3C will be achieved and the core will be positively saturated. The application of $I_P$ will not operate to switch flux in the outer leg adjacent aperture 14 since the M.M.F. developed thereby is insufficient to switch material in the only available path existing; a path including the major aperture 12. The application of $I_A$ will then drive the core into the Clear state switching flux in the inner and outer legs of material adjacent aperture 14 and inducing a voltage in each of the loops 28 and 29 of winding 26 encircling such legs. Because of the winding configuration which places these loops in opposition, the voltages so induced will cancel and a net output of $Z=0$ will be produced.

In the case of $X=0$, $Y=0$, substantially no flux will be switched and core 10 will remain in the Clear state. The application of $I_P$ will fail to switch flux about aperture 14 for the reason above given with respect to FIGURE 3C and the application of $I_A$ thereafter will produce an insubstantial flux change in material under both loops of output winding 26.

The circuit of FIGURE 1 may be utilized in instances wherein it is desirable to drive an indicating device having a relatively high impedance and incapable of producing a back current flow in loop 26 of a quantity sufficient to drive the output winding turns 28 and 29 with an M.M.F. exceeding the core threshold. In many useful circuits, such as, for example, in feed-back shift registers it is desirable to have the output of the Exclusive-OR directly linked to a succeeding core without the use of a diode or transistor interface. If output winding 26 is linked to a succeeding core in the manner of either input winding 22 or 24, flux changes in the succeeding core as the core is driven through the various states of magnetization may possibly produce a back voltage which is undesirable for the reasons above mentioned. The circuit of FIGURE 2 overcomes this shortcoming.

Referring now to FIGURE 2 there is included a core 40 substantially identical to core 10 having input, advance and prime windings substantially identical to the transfer windings shown in FIGURE 1. The output winding 42 includes turns 44 and 46 having a figure 8 configuration identical to the turns 28 and 29 as shown in FIGURE 1 but including a loop 48 linking a succeeding core 60 about the inner leg of the core transmitting aperture. Core 60 may be considered as having an advance and prime windings 64 and 66 having a function as above described with respect to FIGURE 1. Considering core 60 to be in Clear state shown in FIGURE 3, the generation of an output $Z=1$ on winding 42 will produce an M.M.F. applied to core 60 driving the core material about a path including substantially half the magnetic material about the core major aperture into positive saturation thus setting the core. The application of $I_P$ via winding 66 will thereafter drive the core into a state similar to that shown in FIGURE 3B, Primed Set Y. As heretofore indicated, $I_P$ is a relatively long pulse of considerably less amplitude than $I_A$ and the rate of switching effecting the priming operation is relatively slow. For this reason there will be an insubstantial voltage on winding 42 due to core 60 being primed since such voltage is proportional to the rate of change of flux. The application of $I_A$ to winding 64 will drive core 60 into the Clear state producing an output on winding 68 but not producing an input on winding 42. This is because the orientation of flux in the inner leg adjacent aperture 62 under loop 48, having been switched to the clockwise sense by $I_P$, remains unchanged as the core is driven to the Clear state. The circuit of FIGURE 2 may thus be utilized to accomplish the Exclusive-OR function producing outputs directly to an adjacent core.

While a single core structure has been shown it is contemplated that the circuit of the invention may be employed with core structure defining similar paths but including as an integral part other paths forming the equivalent of other cores.

In an actual unit constructed in accordance with the invention, a magnetic core was employed of bistable ferrite material manufactured by Indiana General Corporation of Keesby, New Jersey, and identified as Material No. 5209. The core included an overall dimension of approximately 247 mils with major and minor aperture dimension of 157 mils and 24 mils, respectively. The advance and prime windings included 3 turns and 3 turns, respectively, in the sense indicated in FIGURE 1. The input windings included 1 turn in the sense indicated and the output windings included a figure 8 winding having two turns through the major and four turns through the minor in the manner indicated in FIGURE 1. The one input signals employed constituted 1400 milliamperes pulses of approximately 1 microsecond duration. The advance current was formed by pulse 2200 milliamperes amplitude and 4 microseconds duration; the prime current employed being a pulse of 125 milliamperes amplitude and 50 microseconds duration. The circuit was driven to perform all of the Exclusive-OR functions without spurious loss or gain of intelligence at a frequency per function exceeding 10 kc.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in there proper perspective against the prior art.

We claim:

1. An intelligence manipulating circuit for performing logic functions by producing an output responsive to dissimilar inputs and excluding an output responsive to similar inputs, said circuit comprising a single core of saturable magnetic material having input and output minor apertures and a central major aperture defining distinct material paths of possible flux closure; an input circuit including a first winding threading the core input aperture encircling one distinct path and a second winding threading the core input aperture encircling a second distinct path, the input windings being adapted to set flux in either or both of such paths responsive to individual input signals on said windings; a transfer circuit including a prime winding threading the core output aperture and intersecting the said material paths, the prime winding being adapted to reverse flux in a local path about said output winding when one of said paths has been set and an advance winding threading said central aperture and adapted to clear flux in both of said paths; an output circuit including a winding forming loops encircling said paths adjacent the output aperture, the loops being oppositely oriented such that a substantial output signal will be developed in the output circuit by flux changes occurring in one of said paths under one of said loops responsive to flux being cleared by the advance winding.

2. A logic circuit for performing an Exclusive-OR function with respect to inputs of binary intelligence, said circuit comprising a single core formed of magnetic material capable of being driven into a number of distinct stable states representative of intelligence, the core including input and output minor apertures and a central major aperture forming distinct magnetic paths of possible flux closure; an input circuit including a first winding threading the input minor aperture and encircling an outer leg included in one of said paths adjacent the input aperture and a second winding threading the input aperture and encircling an inner leg included in another of said paths adjacent the input aperture; a transfer circuit including a prime winding threading the output aperture and an advance winding threading the central aperture; an output circuit adapted to drive a utilization circuit including a winding forming loops encircling inner and outer legs included in said paths adjacent the output aperture, the output winding being responsive to rapid flux changes in one of said legs to produce an output signal and responsive to rapid flux changes in both of said legs to produce no output signal.

3. In an intelligence control circuit of the type adapted to perform an Exclusive-OR logic function with respect to binary intelligence inputs, said circuit employing at least two multi-aperture magnetic cores of saturable magnetic material linked by an intelligence transfer circuit including an advance winding adapted to drive the cores to a clear state and a prime winding adapted to drive the cores to a primed set state; an input circuit including windings linking different portions of one core adjacent the core minor input aperture, each winding being adapted to individually set such core, and an output circuit including windings forming loops encircling portions of the one core adjacent the core minor aperture, the said loops being oppositely oriented with respect to each other; the output circuit further including a winding linking an adjacent core through a portion of the adjacent core output minor aperture.

4. A logic circuit for performing Exclusive-OR functions with respect to binary intelligence inputs, said circuit comprising a single core of saturable magnetic material having input and output minor apertures and a central major aperture defining distinct paths including inner and outer legs adjacent said minor apertures capable of being driven by applied M.M.F. into stable states defining core states of clear, set or primed set; a transfer circuit including an advance winding threading the core major aperture and adapted to drive the core into the clear state responsive to advance current applied thereto and a prime winding threading the core output aperture and adapted to drive the core from the set state to the primed set state responsive to priming current applied thereto; an input circuit including a first winding linking the outer leg of a core path adjacent the input minor aperture and adapted to drive the core into the set state responsive to a relatively large current applied thereto and a second winding linking the inner leg of a core path adjacent the input minor aperture and adapted to drive the core into the set state responsive to the application of a relatively large current thereto; an output circuit including windings encircling the inner and outer legs of the core output aperture forming loops about each leg relatively oppositely oriented; the output windings being adapted to respond to flux changes in one leg when the core is driven from the prime set state to the clear state to produce an output signal and being adapted to respond to flux changes in both legs to provide a cancellation of voltages induced therein.

5. The circuit of claim 4 wherein the output circuit is connected in series with a relatively high impedance voltage sensitive load.

6. The circuit of claim 4 wherein the output circuit links the inner leg of the output aperture of an additional core having a transfer circuit similar to that defined in claim 4.

7. A logic circuit for performing Exclusive-OR functions with respect to binary intelligence inputs, said circuit comprising a single core of saturable magnetic material capable of being driven into distinct stable states of magnetization including clear, set and primed set states; the core including input and output minor apertures and a centrally disposed major aperture defining a plurality of paths of magnetic material about the apertures; a transfer circuit including advance and prime windings adapted to drive the core into the clear and primed set states responsive to advance and prime currents applied thereto; an input circuit including a first winding threading the core input aperture and encircling a path of magnetic material extending about the input aperture and the major aperture and a second input winding threading the core input aperture and the major aperture and encircling a path of magnetic material extending about the input aperture and major aperture different from the path encircled by said first input winding; each of the input windings being adapted to drive the core into a set state; an output circuit including a winding threading the output aperture and forming loops encircling portions of the magnetic material paths adjacent the output aperture in an opposite sense; whereby the output winding being thus responsive to flux changes in one of said paths under one of said loops to produce a substantial output signal and response to flux changes in both of said paths under said loops to produce an insubstantial output signal.

References Cited by the Examiner

UNITED STATES PATENTS

| | | | |
|---|---|---|---|
| 2,995,731 | 8/1961 | Sweeney | 340—174 |
| 3,056,117 | 9/1962 | Booth | 340—174 |
| 3,077,582 | 2/1963 | Bauer | 340—174 |

IRVING L. SRAGOW, *Primary Examiner.*